June 28, 1927.

K. D. MONTGOMERY

GREASE CUP

Filed July 17, 1926

1,634,112

Inventor:
Knowlton D. Montgomery,
By
Herbert S. Fairbanks
Attorney.

Patented June 28, 1927.

1,634,112

UNITED STATES PATENT OFFICE.

KNOWLTON D. MONTGOMERY, OF LANSDALE, PENNSYLVANIA.

GREASE CUP.

Application filed July 17, 1926. Serial No. 123,084.

In the manufacture of grease cups it is customary to employ, in the rear of the plunger, a spring which contributes to effect the forward or feeding movement of the plunger. In the use of a grease cup of this character, the spring oftentimes gets out of alignment which causes the plunger to bind.

The object of this invention is to devise a novel grease cup in which a novel plunger construction is employed which embodies novel means to maintain the proper alignment of the springs.

With the above and other objects in view as will hereinafter more clearly appear, my invention comprehends a novel grease cup having novel means for aligning the spring.

Other novel features of construction and advantage will hereinafter more clearly appear in the detailed description and the appended claims.

For the purpose of illustrating the invention, I have shown in the accompanying drawing a typical embodiment of it, which, in practice, will give reliable and satisfactory results. It is, however, to be understood that this embodiment is typical only and that the various instrumentalities of which my invention consists can be variously arranged and organized, and the invention is not, therefore, limited to the precise arrangement and organization of these instrumentalities as herein set forth.

Similar numerals of reference indicate corresponding parts.

Referring to the drawings:—

Figure 1:
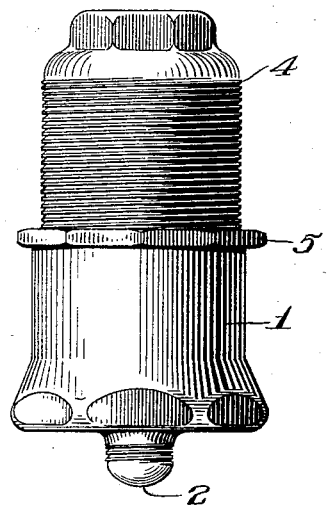
Figure 1 is a front elevation of a grease cup embodying my invention.
Figure 2:
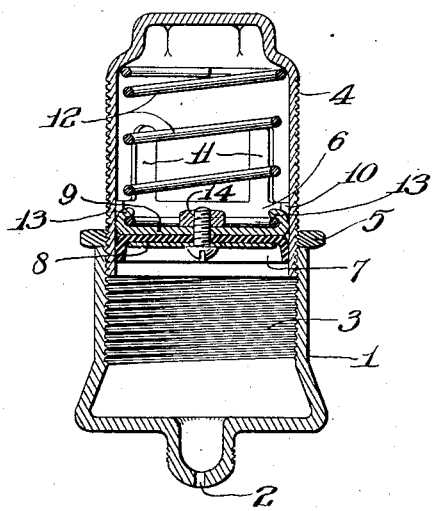
Figure 2 is a section on line 2—2 of Figure 1.
Figure 3:
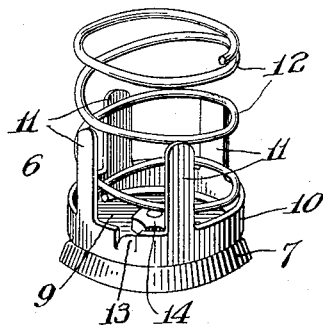
Figure 3 is a perspective view of the plunger and spring.

The grease cup is provided with a chambered body portion 1, having an externally threaded discharge outlet 2, and internally threaded at its opposite end as at 3 in order to adapt it to receive the conventional externally threaded cap 4, which latter is provided with a lock nut 5. Within the cap a plunger 6 is slidably mounted. This plunger 6 consists of a cup shaped washer 7 within which is positioned a disc 8 preferably of metal.

In rear of the cup shaped washer is a disc 9 preferably of metal having a rearwardly extending annular flange 10 from which extend rearwardly the spaced guide members 11 which serve to retain in proper alignment a spring 12.

The forward end of the spring 12 is fixed relatively to the disc 9 by means of clips 13 provided from the flange 10 and bent laterally and forwardly to embrace the forward end of such spring. 14 is a fastening device in the form, as illustrated, of a screw and nut, the screw passing through the disc 8, the washer 10 and the disc 9. It will thus be seen that the plunger forms a unit of structure with the spring, as the forward end of the spring is fixed to the plunger.

When the grease cup is to be filled, the cap is unscrewed from the body portion and the body portion is filled with the grease or other lubricant. The cap with the plunger within it is then assembled with the body portion. Air will be trapped in the cap in rear of the plunger and the air and the spring contribute to advance the plunger to effect the feed of the lubricant. As the lubricant is used, the cap is, from time to time, advanced on the body portion and the lock nut tightened.

The spring is maintained, at all times, in its proper alignment with the plunger, and the guide members prevent the spring from getting out of alignment.

It will be understood from the foregoing that in accordance with my present invention, I employ a washer or gasket slidable within the cap and provided with reinforcing means having portions deflected to form clips to engage the forward end of the spring and having guide members exterior of the spring and extending rearwardly to maintain the proper alignment of the spring and plunger within the cap.

The outer or rear end of the spring is seated within the rear end of the chamber within the cap. It will be apparent that in my present invention I have devised a simple and economical construction which maintains the spring at all times in proper alignment with the plunger so that a rectilinear movement of the plunger will take place within the cap and the spring does not have a tendency to cause the plunger to bind within the cap.

It will now be apparent that I have devised a new and useful grease cup which embodies the features of advantage enumerated as desirable in the statement of the invention and the above description, and that while I have, in the present instance, shown and described a preferred embodiment thereof which will give in practice satisfactory and reliable results, it is to be understood that this embodiment is susceptible of modification in various particulars without departing from the spirit or scope of the invention or sacrificing any of its advantages.

Having thus described my invention what I claim as new and desire to secure by Letters Patent, is:—

1. In a grease cup, a chambered body portion having a discharge outlet, a cap in threaded engagement with said body portion, a plunger within said cap and a spring connected at its forward end to said plunger, said plunger, having formed from it rearwardly extending spaced guide members to maintain alignment of said spring.

2. In a grease cup, a chambered body portion having a discharge outlet, a cap in threaded engagement with said body portion, a plunger including a washer slidable within said cap, a disc fixed with respect to said washer and having formed from it rearwardly extending guide members, and a spring having its forward end fixed to said disc and aligned by said guide members.

3. In a grease cup, a chambered body portion having a discharge outlet, a cap in threaded engagement with said body portion, a spring having its rear end seated in said cap, a plunger including a washer slidable within said cap, and reinforcing means for said washer comprising a disc having portions deflected to form clips to engage the forward end of said spring, and having guide spaced members exterior of the spring to maintain its alignment in said cap.

KNOWLTON D. MONTGOMERY.